(12) United States Patent
Matsushima

(10) Patent No.: US 8,223,359 B2
(45) Date of Patent: *Jul. 17, 2012

(54) PRINTING DEVICE AND PRINTING METHOD

(75) Inventor: Noriyuki Matsushima, Tokyo (JP)

(73) Assignee: Konica Minolta Business Technologies, Inc., Chiyoda-Ku, Tokyo (JP)

( * ) Notice: Subject to any disclaimer, the term of this patent is extended or adjusted under 35 U.S.C. 154(b) by 1394 days.

This patent is subject to a terminal disclaimer.

(21) Appl. No.: 11/435,846

(22) Filed: May 18, 2006

(65) Prior Publication Data

US 2007/0188773 A1    Aug. 16, 2007

(30) Foreign Application Priority Data

Feb. 14, 2006    (JP) .................................. 2006-037150

(51) Int. Cl.
*G06F 3/12* (2006.01)

(52) U.S. Cl. ...................................... 358/1.15; 358/1.16

(58) Field of Classification Search .................. 358/1.15, 358/1.9, 1.13, 1.14, 1.16, 1.12, 1.17, 404, 358/434, 444

See application file for complete search history.

(56) References Cited

U.S. PATENT DOCUMENTS

| | | | |
|---|---|---|---|
| RE37,031 E * | 1/2001 | Nishiwaki | ..................... 358/1.14 |
| 6,181,440 B1 | 1/2001 | Masuda | |
| 6,529,286 B1 * | 3/2003 | King | .............................. 358/1.14 |
| 7,239,404 B2 * | 7/2007 | Fukushima | ................... 358/1.14 |
| 7,253,920 B2 | 8/2007 | Hosada | |
| 7,528,978 B2 * | 5/2009 | Randt | .......................... 358/1.15 |
| 7,800,767 B2 * | 9/2010 | Matsushima et al. | ........... 358/1.1 |
| 2005/0030574 A1 * | 2/2005 | McVey et al. | ................. 358/1.14 |
| 2006/0285148 A1 | 12/2006 | Matsushima et al. | |

FOREIGN PATENT DOCUMENTS

| | | |
|---|---|---|
| JP | 08-002791 | 1/1996 |
| JP | 8-314659 A | 11/1996 |
| JP | 11-348359 | 12/1999 |

(Continued)

OTHER PUBLICATIONS

Office Action dated Sep. 17, 2009 in U.S. Appl. No. 11/237,892, filed Sep. 29, 2005.

(Continued)

*Primary Examiner* — David K. Moore
*Assistant Examiner* — Vu Hang
(74) *Attorney, Agent, or Firm* — Buchanan Ingersoll & Rooney PC

(57) ABSTRACT

The printing device receives the printing data for confidential printing, and determines an output destination of the printing data received for confidential printing to be either a lockable output bin or a digital output bin. The lockable output bin can be locked and unlocked by a key and the print data can be output to the lockable output bin in a form of being printed on recording medium. The digital output bin holds the printing data and allows the printing data being held therein to be read out for printing when a user is verified. When the lockable output bin is assigned as the output destination and the lockable output bin of the printing device that received the printing data is in an unusable state, another printing device having a lockable output bin that can be used is searched and the printing data is transferred to the other printing device.

61 Claims, 11 Drawing Sheets

FOREIGN PATENT DOCUMENTS

| JP | 2000-353072 | 12/2000 |
|----|-------------|---------|
| JP | 2001-265561 | 9/2001 |
| JP | 2004-094816 A | 3/2004 |
| JP | 2004-306287 | 11/2004 |
| JP | 2005-007617 | 1/2005 |
| JP | 2006-001241 | 1/2006 |

OTHER PUBLICATIONS

Notification of Reason for Refusal in JP 2006-037150 dated Jun. 9, 2009, and an English Translation thereof.

Notification of Reason for Refusal dated Jul. 5, 2011 in Japanese Application No. 2009-182599, the divisional application of corresponding Japanese Patent Application No. 2006-037150 and English translation thereof.

Notification of Reason for Refusal dated Feb. 22, 2011 in Japanese Application No. 2009-182599, the divisional application of corresponding Japanese Patent Application No. 2006-037150 and English translation thereof.

* cited by examiner 300A,300B,300C

- 301 CPU
- 302 MEMORY
- 303 HARD DISK
- 304 OPERATING PANEL UNIT
- 305 ADF
- 306 IMAGE READING UNIT
- 307 PAPER FEEDING UNIT
- 308 IMAGE FORMING UNIT
- 309 PAPER DISCHARGE UNIT
- 310 COMMUNICATION INTERFACE
- 311

FIG.12

| Paper size and orientation | Estimated printing time per page for each printing mode (sec) | | | |
|---|---|---|---|---|
| | Color single side | Monochro single side | Color double side | Monochro double side |
| A6LEF | 0.4 | 0.2 | 0.9 | 0.5 |
| A5LEF | 0.6 | 0.3 | 1.3 | 0.7 |
| A4LEF | 1.0 | 0.5 | 2.1 | 1.1 |
| A6SEF | 0.5 | 0.3 | 1.1 | 0.6 |
| A5SEF | 0.9 | 0.5 | 2.0 | 1.0 |
| A4SEF | 1.4 | 0.7 | 3.0 | 1.5 |
| A3SEF | 2.0 | 1.0 | 4.2 | 2.1 |
| B5 | 0.7 | 0.4 | 1.5 | 0.8 |
| B4 | 1.2 | 0.6 | 2.5 | 1.2 |

PRINTING DEVICE AND PRINTING METHOD

CROSS-REFERENCE TO RELATED APPLICATION

This application is based on Japanese Patent Application No. 2006-037150 filed on Feb. 14, 2006, the contents of which are hereby incorporated herein by reference.

BACKGROUND OF THE INVENTION

1. Field of the Invention

The invention relates to a printing device and a printing method.

2. Description of Related Art

When using a printer in an office, it is important to pay attention to prevention of information leakages. Therefore, a printing device such as an MFP (Multi-Function Peripheral), which is commonly used by a plurality of users, normally is equipped with a confidential printing function for preventing a third party from viewing printed matter.

As to the confidential printing function, a method is known for starting to print when the user identification process is completed by the user's operation of the MFP after the print data is transmitted to the MFP (Unexamined Japanese Patent Publication Nos. JP-A-8-314659 and JP-A-2004-94816).

However, if the number of pages to be printed or the printing paper size is large or a printing mode such as color printing or double side printing is set up, it may take a long time for printing after the user identification process is completed. In such a case the user ends up spending a lot of time waiting for the completion of printing in front of the MFP in any case. On the other hand, if users hate to spend long times waiting in front of the printer and opt to use conventional printing instead, the rate of confidential printing usage drops and the information leakage prevention will not be as thorough as it is planned to be.

OBJECTS AND SUMMARY

An object is to provide a printing device and a printing method, which are improved for solving the abovementioned problems.

Another object is to provide a printing device and a printing method for enabling the user not to wait a long time in front of the printing device contrary to the user's will, while preventing information leakage due to printed matter at the same time.

According to one embodiment, there is provided a printing device including a receiving unit, a lockable output bin, a controller, a searching unit and a transferring unit. The receiving unit receives print data for confidential printing. The lockable output bin which can be locked and unlocked by a key and to which the print data can be output in a form of being printed on at least one recording medium. The controller decides an output destination for the received print data to be either the lockable output bin, or a holding unit. The holding unit is capable of holding the print data and allowing the print data held therein to be read out for printing based on user verification. The searching unit searches, when a lockable output bin is decided as the output destination for the print data by the controller and if the lockable output bin of its own printing device is in an unusable state, another printing device having another lockable output bin that can be used. The transferring unit transfers the print data to the other printing device in order to have the print data to be printed on recording medium and output to the other lockable output bin of the other printing device when the other printing device is found by the searching unit.

Said transfer unit preferably transfers information for releasing said lock to said other printing device.

Said controller preferably decides said print data's output destination in accordance with information concerning said print data.

Information concerning said print data preferably is preferably an estimated time required for printing said print data calculated based on the printing condition of the particular print data, and said controller preferably decides that said print data's output destination should be said lockable output bin if said estimated time is larger than said threshold value and that said print data's output destination should be said holding unit if said estimated time is smaller than said threshold value.

Otherwise, information concerning said print data preferably is a number of pages to be printed based on said print data, and said controller preferably decides that said print data's output destination should be said lockable output bin if said number of pages to be printed is larger than said threshold value and that said print data's output destination should be said holding unit if said number of pages to be printed is smaller than said threshold value.

Said controller preferably decides said print data's output destination in accordance with information concerning said print data, which is corrected based on degree of importance of confidentiality of said print data.

Said holding unit is preferably provided in its own printing device.

Said holding unit preferably converts the print data into bitmap format data and is provided in a printing control unit used for transferring said data to said printing device.

Otherwise, said holding unit is preferably provided in a device on a network communicable with the particular printing device.

Said printing device preferably further comprises a notifying unit that notifies the decided print data's output destination.

Said notifying unit preferably further notifies completion of the print data's printing.

According to another embodiment, there is provided a printing device including a receiving unit, a lockable output bin, a judging unit and a controller. The receiving unit receives print data for confidential printing. The lockable output bin can be locked and unlocked by a key and the printing data can be output to the lockable output bin in a form of being printed on at least one recording medium. The judging unit makes a judgment as to whether the received print data is transferred from another printing device or not. The controller decides an output destination for the received print data to be either the lockable output bin, or a holding unit. The holding unit is capable of holding the print data and allowing the print data held therein to be read out for printing based on user verification. The controller assigns the lockable output bin as the output destination for the print data when the print data is judged to be transferred from another printing device.

Said receiving unit preferably receives information for releasing said lock.

Said controller decides said print data's output destination in accordance with information concerning said print data, if said print data is not the one transferred from another printing device.

Said printing device preferably further comprises a notifying unit that notifies the decided print data's output destination.

Said notifying unit preferably further notifies completion of the print data's printing together with information for identifying its own printing device.

The objects, characteristics and properties other than those set forth above will become apparent from the description given herein below with reference to embodiments illustrated in the accompanying drawings.

BRIEF DESCRIPTION OF THE DRAWINGS

FIG. 12 is an example of estimated printing time per page in each printing mode.

DETAILED DESCRIPTION OF PREFERRED EMBODIMENTS

The embodiment will be described below with reference to the accompanying drawings.

Figure 1:
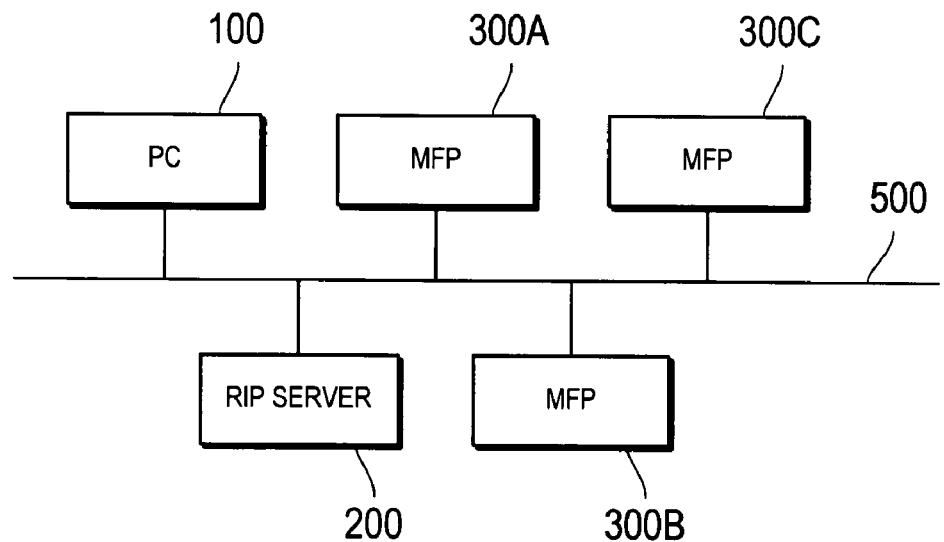
FIG. 1 is a block diagram showing the overall constitution of a printing system according to an embodiment of the present invention.

FIG. 1 is a block diagram showing the overall constitution of a printing system according to an embodiment of the present invention.

The printing system has a PC (personal computer) 100, a RIP server 200 that serves as a printing control device, and an MFP 300 (integral name for 300A through 300C) that serves as a printing device, which are interconnected via a network 500 communicably with each other. The network 500 can be a LAN connecting computers and network equipment according to standards such as Ethernet®, Token Ring, and FDDI, or a WAN that consists of several LANs connected by a dedicated line.

The RIP server 200 and the MFP 300 can be directly connected between them. Moreover, the types and the number of equipment to be connected to network 500 are not limited to those shown in FIG. 1.

The PC 100 has installed an application for creating and editing document files. The PC 100 transmits print data based on a document file instructed to be printed on the application to the RIP server 200.

The RIP server 200 converts the print data received from the PC 100 into bitmap type print data (raster data) to make it understandable by the MFP 300 and transmits it to the MFP 300. The RIP server 200 is realized by using a workstation or a PC in general.

Figure 2:
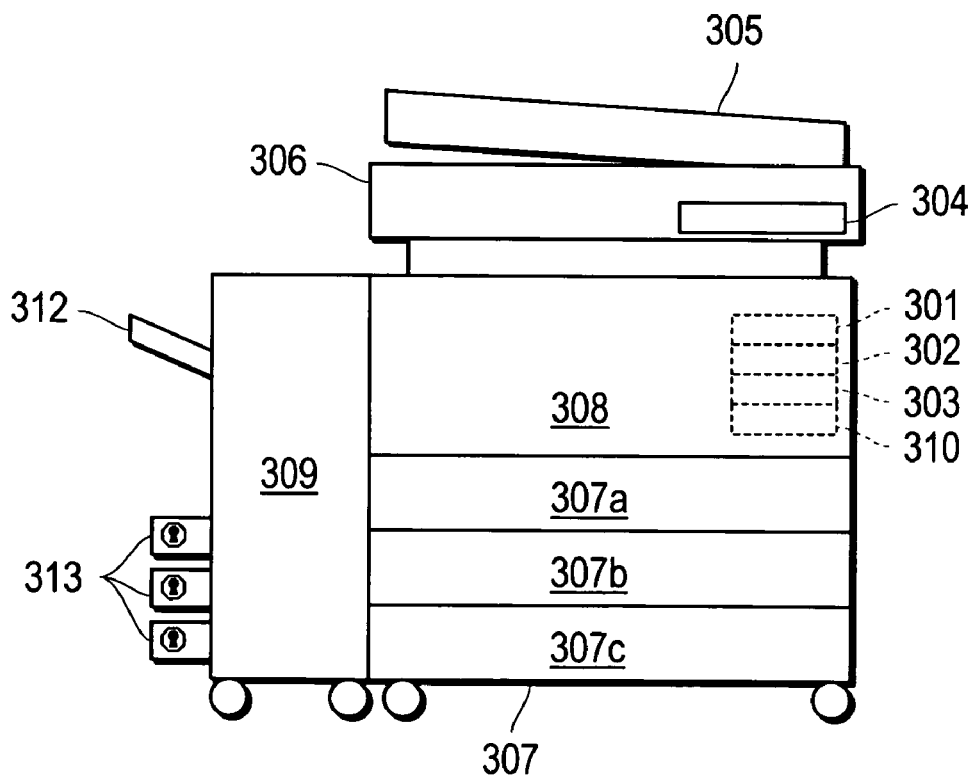
FIG. 2 is a schematic front view of an MFP according to embodiment of the present invention.
Figure 3:
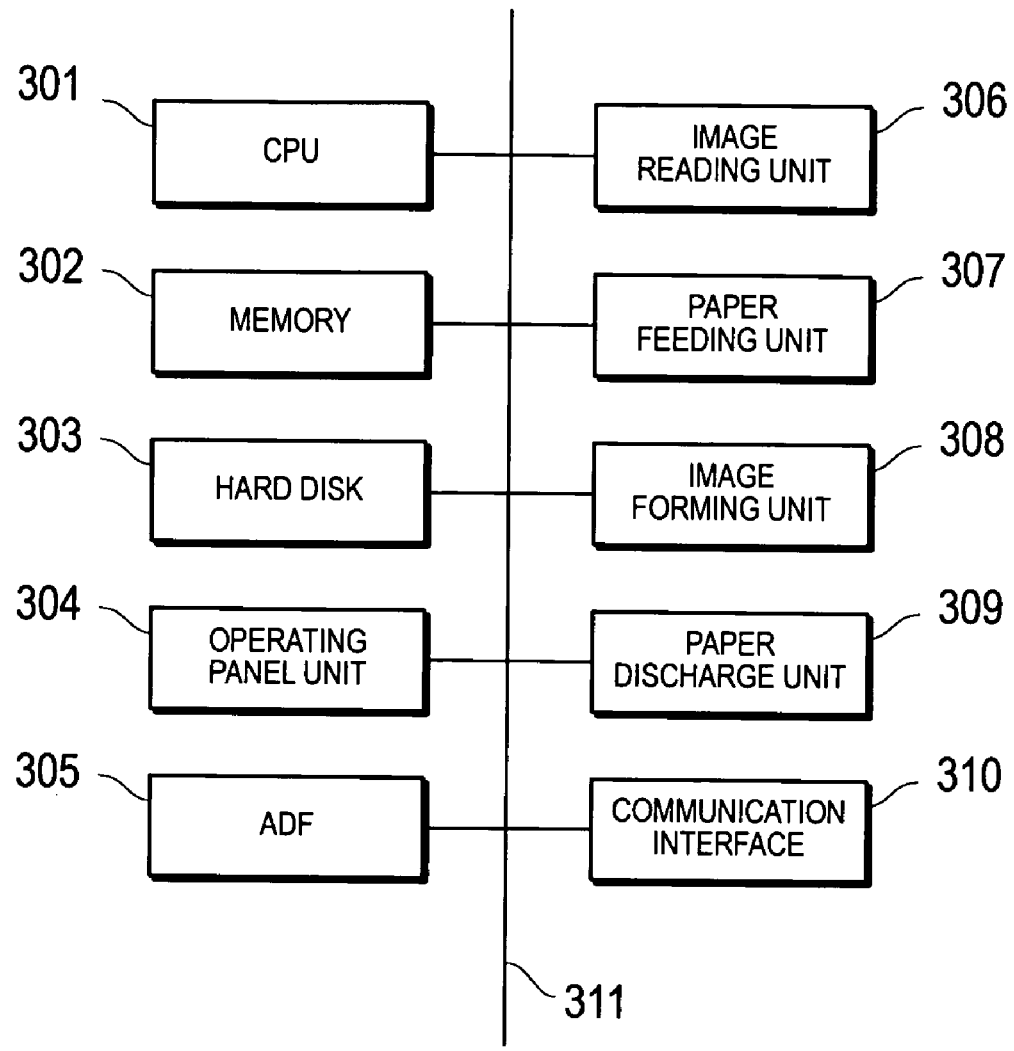
FIG. 3 is a block diagram showing the hardware constitution of the MFP of the present invention.

FIG. 2 is a schematic front view of the MFP 300, and FIG. 3 is a block diagram showing the hardware constitution of the MFP 300.

The MFP 300 has a CPU 301, a memory 302, a hard disk 303, an operating panel unit 304, an ADF (Auto Document Feeder) 305, an image reading unit 306, a paper feeding unit 307, an image forming unit 308, a paper discharge unit 309, and a communication interface 310, all of which are interconnected via a bus 311 for exchanging signals.

The CPU 301 controls various parts indicated above and executes various arithmetic processes according to a program. The memory 302 stores programs and data temporarily as a working area. The hard disk 303 stores various programs including an operating system and data.

The hard disk 303 has an area for a digital output bin, which is a holding area that can hold print data and allows print data held in there to be taken out for printing when the user identification is confirmed.

The operating panel unit 304 is equipped with a touch panel, a ten-key pad, a start button, a stop button and others to be used for displaying various data and entering various instructions.

The ADF 305 transports a single or multiple sheets of paper one sheet at a time to a specified reading position of the image reading unit 306, and discharges the document sequentially after reading it.

The image reading unit 306 irradiates a document set on the specified reading position or transported to the specified reading location by the ADF 305 with a light source such as a fluorescent lamp, converts reflected light from the document surface into electrical signals with the help of light sensitive devices such as a CCD image sensor, and generates image data from the electrical signals.

The paper feeding units 307a through 307c contain paper which is used as recording media in the printing process. The paper feeding unit 307 (integral name for 307a through 307c) feeds the contained paper to the image forming unit 308 one sheet at a time.

The image forming unit 308 prints various data on paper using a known imaging process such as the electronic photographing process which includes various steps such as electrical charging, exposure, developing, transferring and fixing steps.

The paper discharge unit 309 discharges printed paper transported from the image forming unit 308. The paper discharge unit 309 is equipped with a normal output bin 312 and a lockable output bin 313. The normal output bin 312 is a bin to which paper printed with print data in normal printing, or paper printed with print data which has been held in a digital output bin when the user identification is confirmed in confidential printing can be discharged. The lockable output bin 313 is a bin which can be locked or unlocked by a key and to which print data can be output in a printed form in confidential printing. The key is an electronic key in this embodiment.

Therefore, the lockable output bin 313 can be opened by the users input of unlocking information to release the lock. However, the invention can be constituted in such a way as to be able to use a physical key. Incidentally, although three lockable output bins 313 are shown in FIG. 2, the number of lockable bins 313 can be any number.

The communication interface 310 is typically a LAN card and is used for communicating with external equipment via a network 500.

The MFP 300 can include components other than those components mentioned above, or can lack some of the components mentioned above.

The operation of the MFP 300 in this embodiment will be described in the following.

Figure 4:
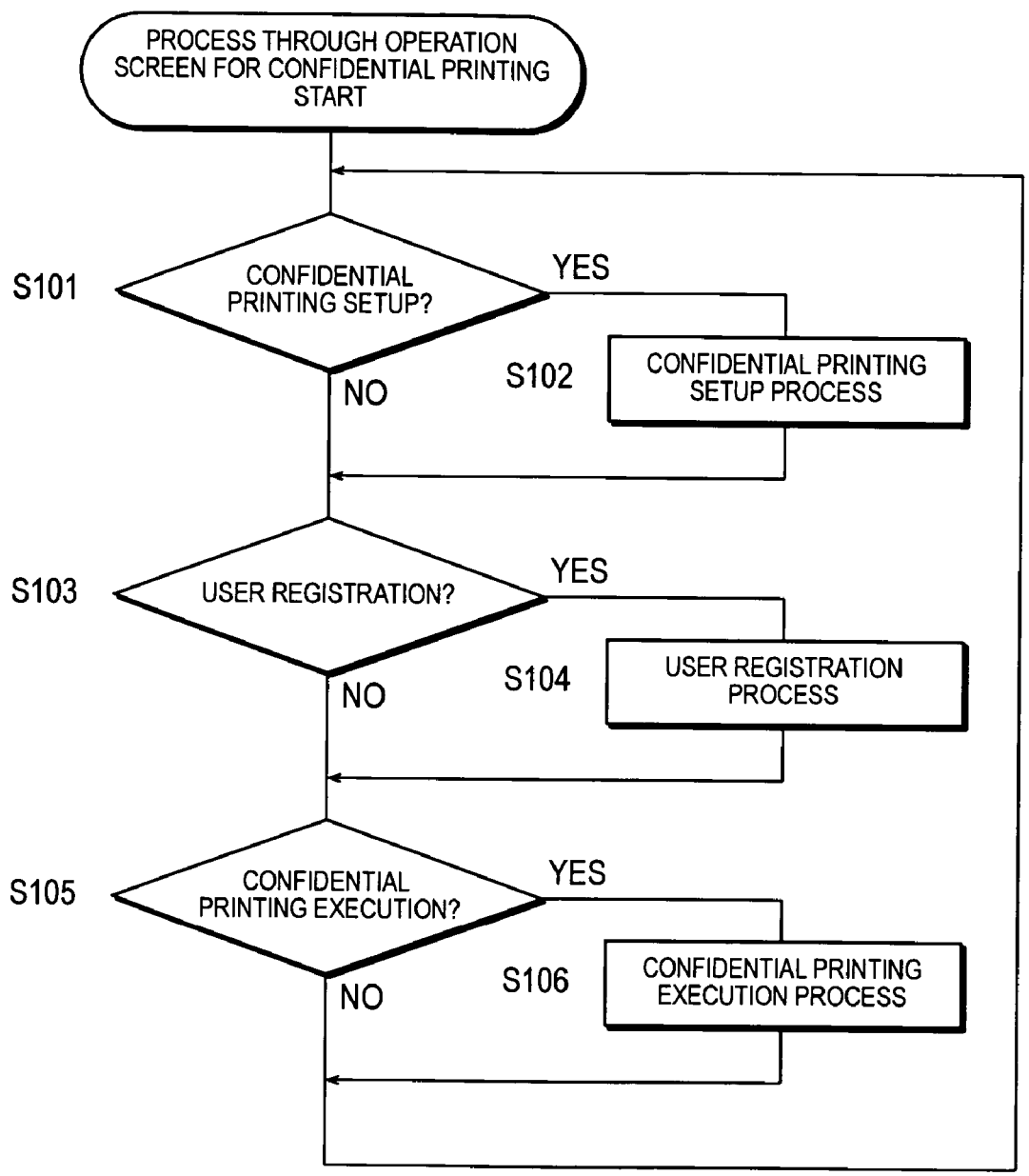
FIG. 4 is a flowchart showing the sequence of the process through an operating screen for confidential printing on the MFP of the present invention.

FIG. 4 is a flowchart showing the sequence of the process through an operating screen for confidential printing on the MFP 300. The algorithm shown in the flowchart of FIG. 4 is stored as a program in the hard disk 303 of the MFP 300 and executed by CPU 301.

First, the MFP 300 makes a judgment whether "confidential printing setup" is selected on the operating screen for confidential printing displayed on the operating panel unit 304 by the user's operation or not (S101). If the "confidential printing setup" is not selected (S101: No), the program advances to the step S103.

If the "confidential printing setup" is selected (S101: Yes), the confidential printing setup screen is displayed on the operating panel unit 304 and the confidential printing setup is processed using the confidential printing setup screen (S102).

Figure 5:
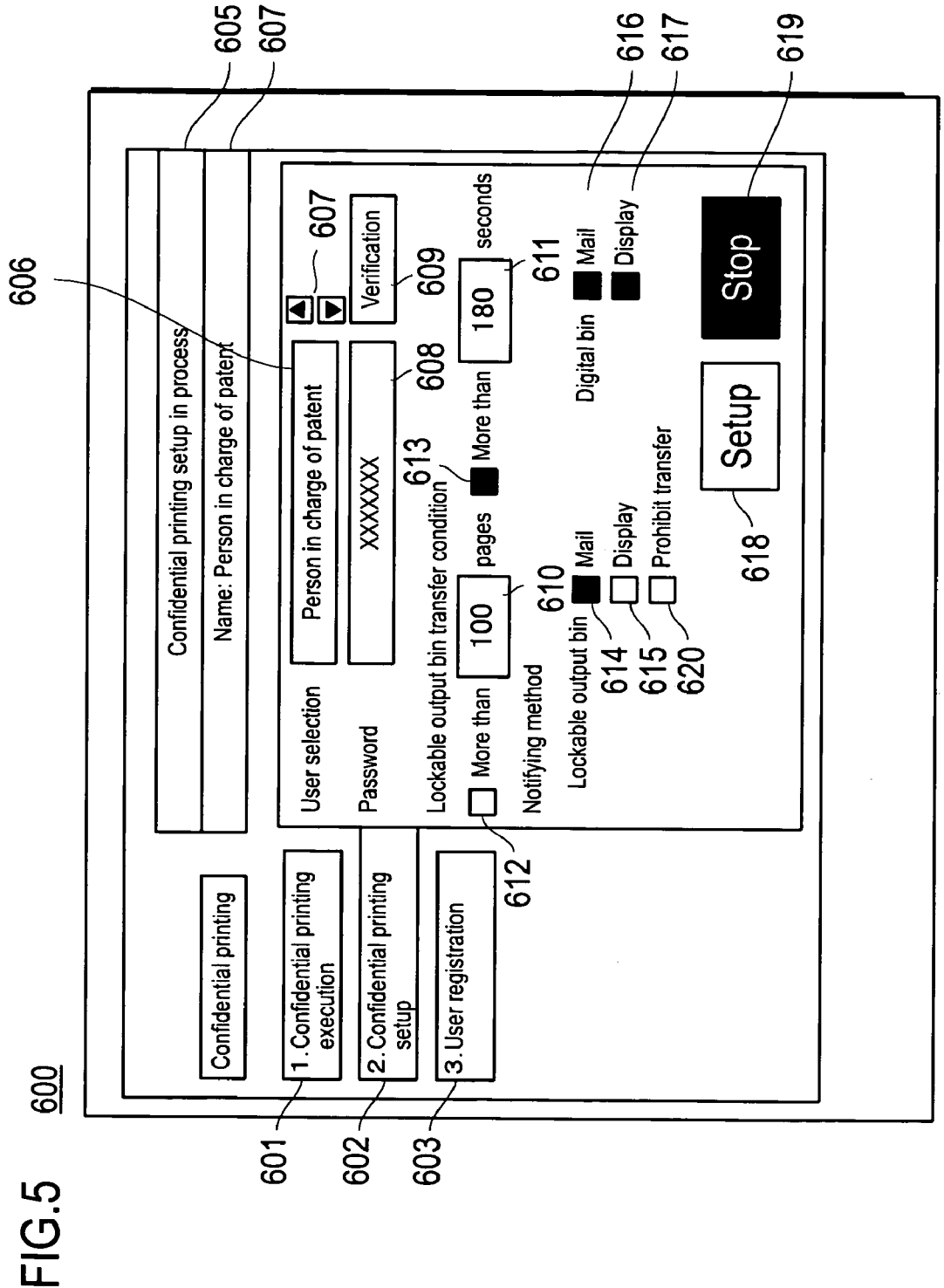
FIG. 5 shows an example of a confidential printing setup screen.

FIG. 5 shows an example of a confidential printing setup screen. The confidential printing setup screen 600 has operation switching buttons 601, 602, and 603 to switch its operation status between "confidential printing execution," "confidential printing setup," and "user registration." The confidential printing setup screen 600 also has a status display unit 605 to show the current operation status and a user display unit 604 to show the name of the user for whom the setup work is being done. The user is set up by being selected in the user selection unit 606. The user is selected here using the up and down scroll 607. After the user is selected, a password is entered into an input box 608. When a verification button 609 is pressed, the verification operation starts and a specific confidential printing setup is allowed once the verification is completed.

Setup items include information concerning the print data to be used as a judgment criterion for determining the output destination for the received print data whether a lockable bin or a digital output bin is to be used. More specifically, the setup items concerning the judgment criterion for determining the output destination include an input box 610 and a input box 611. The input box 610 is used for entering a lower limit of printing number of sheets (threshold value Pa) based on the print data to decide that the output destination should be a lockable output bin. The input box 611 is used for entering a lower limit of expected time (threshold value Ta) needed for printing the print data to decide that the output destination should be a lockable output bin. Moreover, check boxes 612 and 613 are provided for selecting based on the print data either the number of sheets to be printed or the estimated time required for printing the print data as the judgment criterion for determining the output destination.

It is also possible to select the method of notifying either by e-mail by checking the checkbox 614, or by means of the operating panel unit 304 of the MFP 300 by checking the checkbox 615 as a method of notifying the user that a lockable output bin was chosen as the output destination and that the print data was printed and output to the lockable output bin. Similarly, it is possible to select the method of notifying either by e-mail by checking the checkbox 616 or by means of the operating panel unit 304 of the MFP 300 by checking the checkbox 617 as a method of notifying the user that a digital output bin was chosen as the output destination and that the print data held in the digital output bin was printed and output to the normal output bin.

A setup button 618 is selected by the user when the setup process of confidential printing is completed. A stop button 619 is selected by the user when the setup process of confidential printing is canceled.

Furthermore, the confidential printing setup screen 600 has a checkbox 620 that prohibits the received print data from being transferred to other printing devices such as an MFP. It is constituted in this embodiment in such a way that, if a lockable output bin is assigned as the output destination and the lockable output bin of the printing device which received the print data is in an unusable state, a search is made for another printing device equipped with a lockable output bin that can be used at the moment and the print data is transferred to said another printing device. However this embodiment is not limited to that way. The user can put a checkmark to the checkbox 620 to prohibit the transfer if such a transfer is not desired.

Next, the MFP 300 makes a judgment whether "user registration" is selected on the operating screen for confidential printing displayed on the operating panel unit 304 by the user's operation or not (S103). If the "user registration" is not selected (S103: No), the program advances to the step S105.

If the "user registration" is selected (S103: Yes), the user registration screen is displayed on the operating panel unit 304 and the user registration is processed using the user registration screen (S104).

Figure 6:
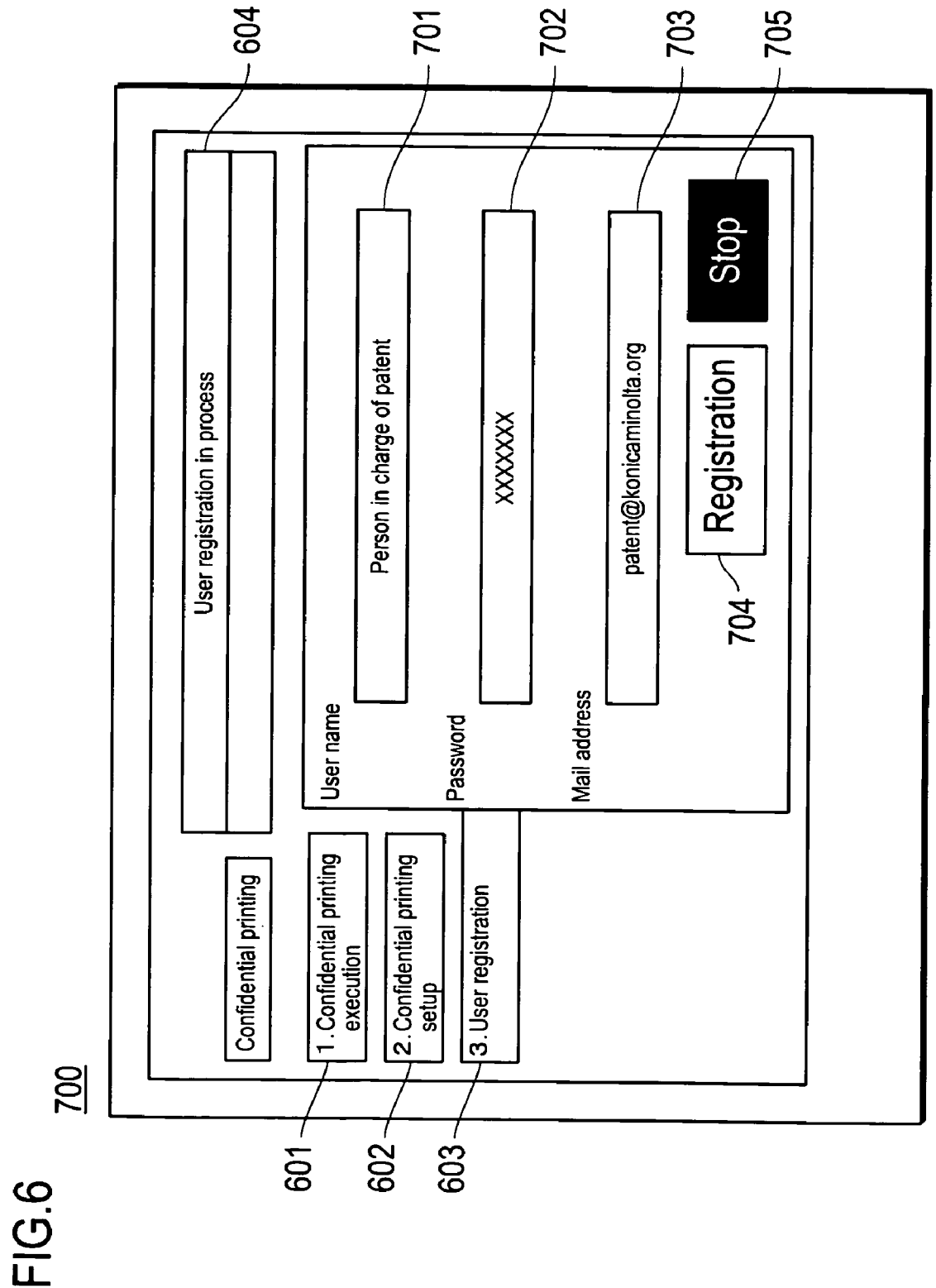
FIG. 6 shows an example of a user registration screen.

FIG. 6 shows an example of a user registration screen. The user registration screen 700 has the operation switching buttons 601, 602, and 603 and the status display part 604 as in the confidential printing setup screen 600.

The user registration screen 700 also has input boxes 701, 702, and 703 for entering user name, password, and e-mail address. A registration button 704 is selected by the user when the input process is completed, and a stop button 705 is selected by the user when the user registration process is canceled.

The user registration operation can be further limited by requiring the verification procedure before displaying the user registration screen 700. The e-mail address is an address for notifying the user the output destination for the print data or printing completion and the entry of this e-mail address is not mandatory.

Next, the MFP 300 makes a judgment whether "confidential printing execution" is selected on the operating screen for confidential printing displayed on the operating panel unit 304 by the user's operation or not (S105). If the "confidential printing execution" is not selected (S105: No), the program advances to the step S101.

If the "confidential printing execution" is selected (S105: Yes), the confidential printing execution screen is displayed on the operating panel unit 304 and the confidential printing execution is processed using the confidential printing execution screen (S106).

Figure 7:
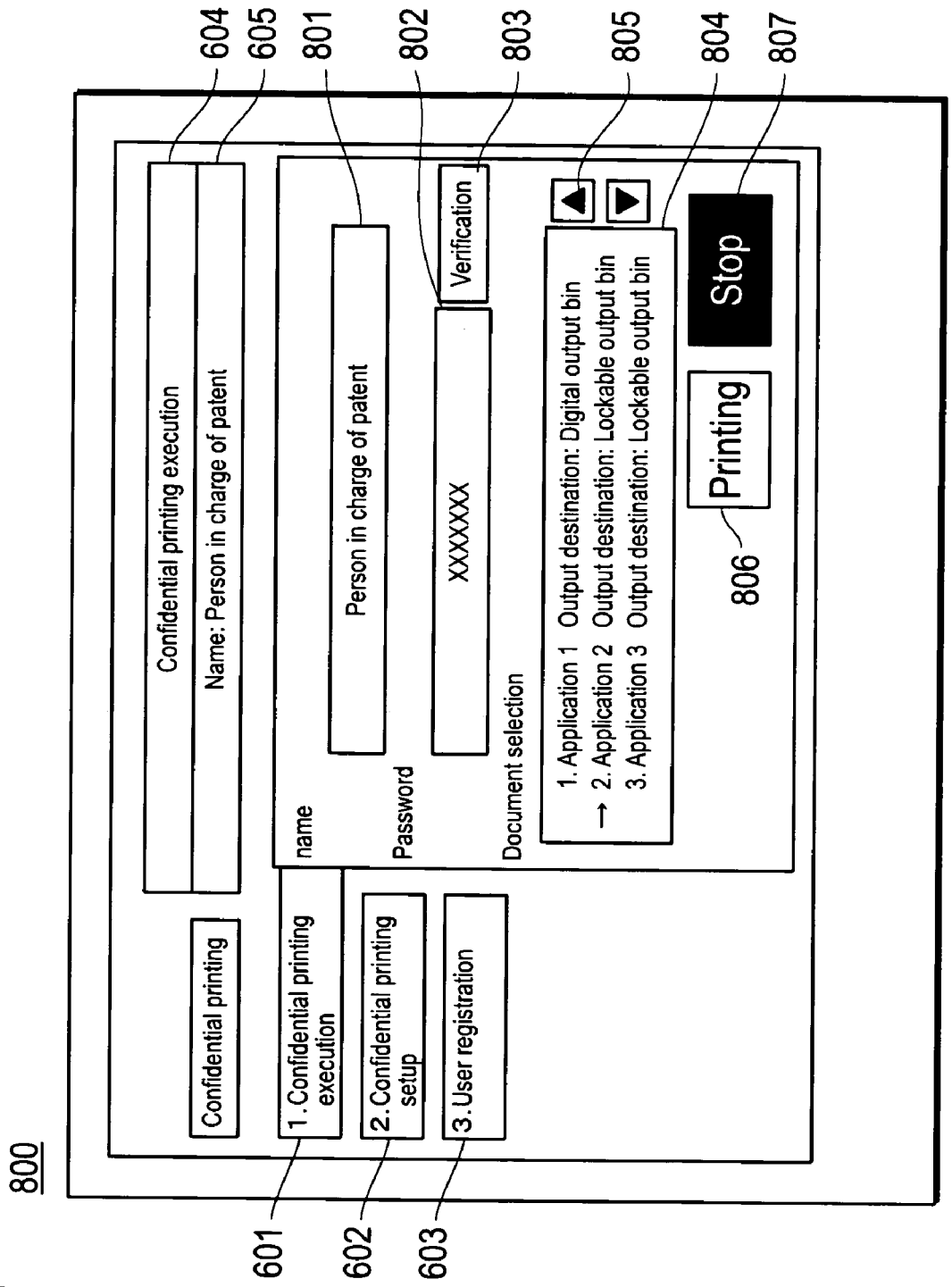
FIG. 7 shows an example of a confidential printing execution screen.

FIG. 7 shows an example of a confidential printing execution screen. The confidential printing execution screen 800 has the operation switching buttons 601, 602, and 603, the status display part 604 and the user display part 605 as in the confidential printing setup screen 600.

In the confidential printing execution screen 800, the user name is entered into the input box 801 and the password is entered into the input box 802. When a verification button 803 is pressed, the verification operation starts and the selection of a document file to be confidentially printed is allowed once the verification is completed. The document selection part 804 displays the document file that corresponds to the print data held for the particular user. The output destination is displayed on the side of the document file name. The print data held in the digital output bin is printed out after it is selected by a selection key 805 and a printing button 806 is pressed. If it is desired to cancel the printing output, a stop button 807 is to be selected by the user.

FIG. 8 through FIG. 11 show flowcharts showing the sequence of the process for receiving confidential print data on the MFP 300. The algorithm shown in the flowcharts of FIG. 8 through FIG. 11 is stored as a program in the hard disk 303 of the MFP 300 and executed by the CPU 301.

First, the MFP 300 receives the print data for confidential printing from the PC 100 via the RIP server 200 (S201).

Next, a judgment is made as to whether said print data is transferred from another MFP or not (S202). If the print data is received by MFP 300A, a judgment is made as to whether the print data is transferred not from PC 100 but from another printing device such as MFP 300B or 300C or not. In this embodiment, a judgment is made here that the print data is transferred from another printing device if the unlocking information for unlocking the lockable output bin 313 is attached to the received print data. However, it is also possible to make such a judgment based on the address of a transmission source of the print data or the machine list.

If the received print data is not the one that has been transmitted from another printing device (step S202: No), a decision process for deciding which of the lockable output bin 313 or the digital output bin should be assigned as the output destination for the received print data (S203). The detail of the decision process concerning the output destination will be described later.

In the step S204, a judgment is made as to whether the output destination decided in the step S203 is the lockable output bin 313 or the digital output bin.

If the output destination decided is a digital output bin (S204: digital output bin), the print data received in the step S201 is held in the digital output bin (S205). The MFP 300 stands by until the user verification is completed in the confidential printing execution process using the execution screen 800 of the confidential printing (S206: No). When the user verification is completed (S206: yes), the print data held in the digital output bin is printed on paper by the image forming unit 308, and discharged to the normal output bin 312 by the paper discharge unit 309 (S207).

In the step S208, the notification process will be done to notify the user that the printing is completed. The detail of the notification process notifying the printing completion will be described later.

Figure 9:
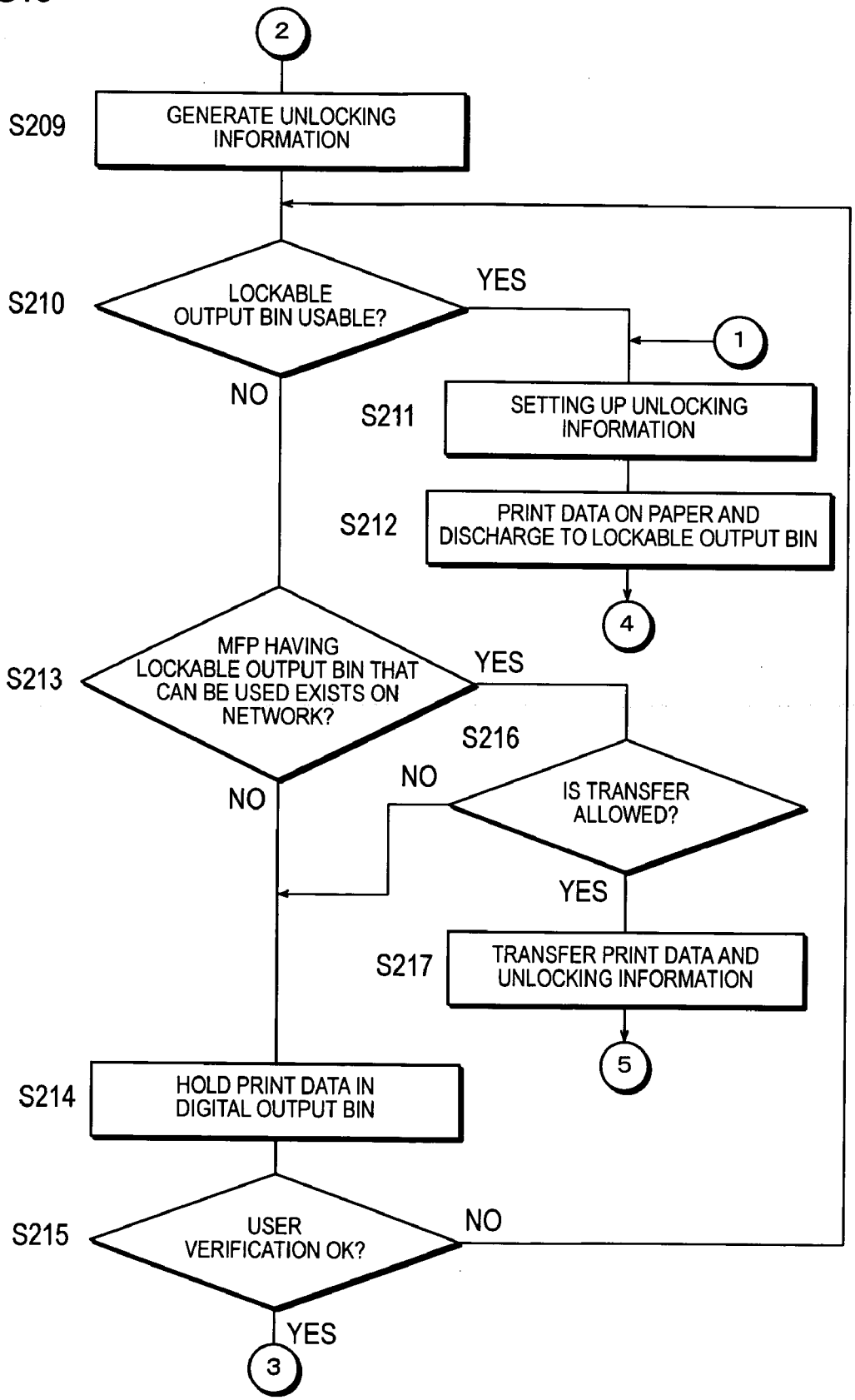
FIG. 9 is a flowchart showing the sequence of the process for receiving confidential print data on the MFP continued from FIG. 8.

On the other hand, if the output destination decided is a lockable output bin (S204: lockable output bin), the program advances to the step S209 shown in FIG. 9.

In the step S209, the MFP 300 generates the unlocking information to release the lock of the lockable output bin 313. This unlocking information is transmitted to, for example, the transmission source of the print data, such as PC 100. Alternatively, the user may generate the unlocking information, attached to the print data, in which case the unlocking information generated by the user is obtained by the MFP 300.

Next, a judgment is made as to whether the lockable output bin 313 is usable or not including whether there is available space in it (S210).

If the lockable output bin 313 is in the usable state (S210: Yes), the MFP 300 sets up the lockable output bin 313 to use the unlocking information (S211). Next, the print data received in the step S201 is printed on the paper by the image forming unit 308 and is discharged by the paper discharge unit 309 to the lockable output bin 313 (S212).

If the lockable output bin 313 is in an unusable state (S210: No), a judgment is made as to whether another MFP having a lockable output bin 313, which is capable of communicating with its own MFP, exists or not (S213). For example, the MFP 300A transmits a query to other MFP 300B and 300C on the network 500 whether they are printing devices having the lockable output bin 313 that can be used or not, and receives their responses. Thus, the system searches for other MFPs having a lockable output bin 313 that can be used.

If it is judged that there are no other MFP having the lockable output bin 313 that can be used in the step S213 (S213: No), the print data received in the step S201 is held in the digital output bin (S214). If the user verification is completed in the confidential printing execution process using the confidential printing execution screen 800 (S215: Yes), the program advances to the step S207 shown in FIG. 8. If it is judged that the user verification is not completed (S215: No), the program returns to the step S210. Thus the print data is printed on paper and discharged to the lockable output bin 313 when the lockable output bin 313 becomes usable before the user verification is completed.

On the other hand, if it is judged in the step S213 that another MFP having lockable output bin 313 that can be used exists (S213: Yes), a judgment is made as to whether the transfer of the print data is permitted or not (S216). It is judged here that the transfer of the print data is allowed if the checkbox 620 for prohibiting the transfer of the received data to another MFP is not checked in the confidential printing setup process using the confidential printing setup screen 600. If the transfer of the print data is not allowed (S216: No), the program advances to the step S214.

If the transfer of the print data is allowed (S216: Yes), the MFP 300 transfers the print data attached with the unlocking information generated in the step S209 to the other MFP found in the step S213 in order to cause the print data to be printed on paper and output to the lockable output bin (S217). Since the unlocking information to allow the printed material to be taken out from the lockable output bin is transferred together, no change for the user's unlocking operation is necessary so that it does not cause the user to feel uncertain even if the printed material is discharged to a different MFP.

If a plurality of other MFPs are found to have a lockable output bin that can be used in the step S213, the print data is transferred to the MFP with the specified highest preference. The specified preferential order can be defined as the order of shortest physical distance.

Figure 8:
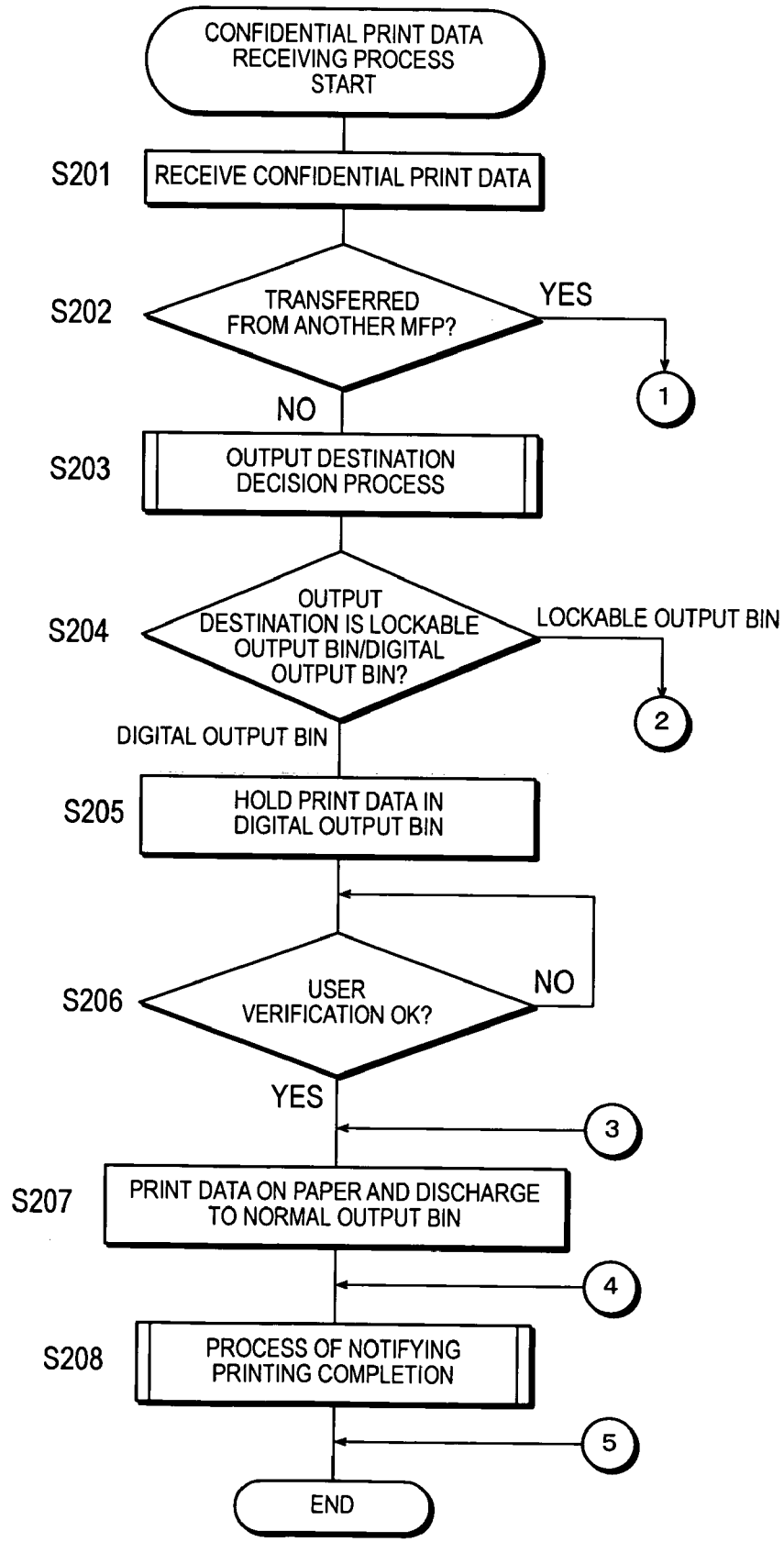
FIG. 8 is a flowchart showing the sequence of the process for receiving confidential print data on the MFP of the present invention.

On the other hand, if it is judged that the received print data has been transferred from another MFP in the step S202 shown in FIG. 8 (step S202: Yes), the program advances to the step S211. In other words, a lockable output bin is assigned as the output destination for the print data without executing the processes of the steps S203 and S204, i.e., regardless of the contents of the information concerning the print data. In the step S211, the unlocking information received from another MFP is set up in the lockable output bin 313 intended to be used. Thus, the print data received from another MFP is printed on paper by the image forming unit 308 and discharged to the lockable output bin 313 by the paper discharge 309 (S212), and the program advances to the step S208.

Figure 10:
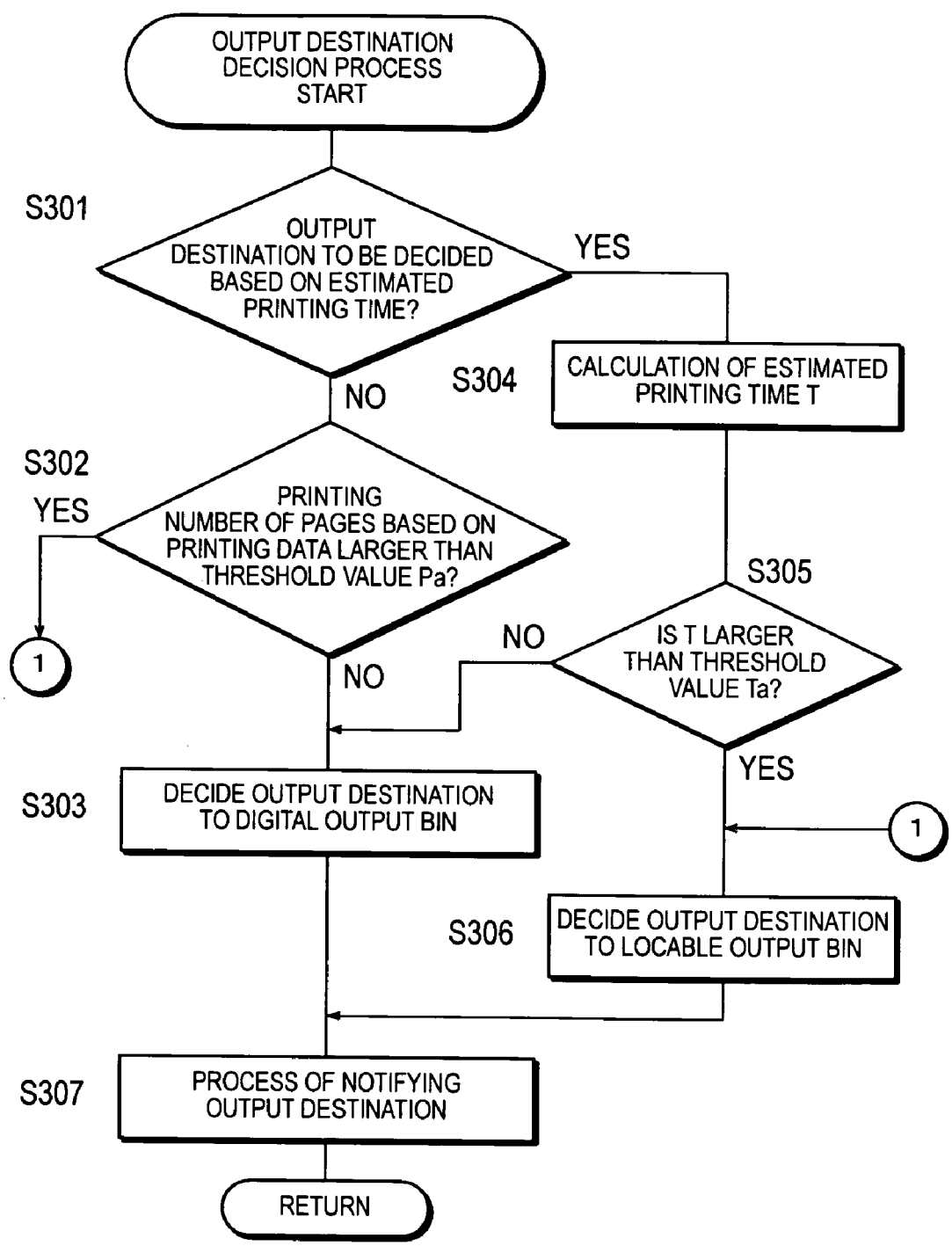
FIG. 10 is a flowchart showing the sequence of the process for deciding an output destination.

Next, the process of deciding the output destination in the step S203 will be described below with reference to FIG. 10.

First, the MFP 300 makes a judgment as to whether estimated printing time is selected or not as a judgment criterion for determining the output destination of print data in the confidential printing setup process using the confidential printing setup screen 600, i.e., whether the output destination is going to be determined based on the estimated printing time or not (S301).

If the estimated printing time is not selected as a judgment criterion for determining the output destination of the print data (S301: No), it is assumed that the number of pages to be printed based on the print data is selected as the judgment criterion for determining the output destination of the print data, and a judgment is made as to whether the number of pages to be printed based on the print data is equal to or larger than a predetermined threshold value Pa or not (S302).

If it is determined that the number of pages to be printed is larger than the threshold value Pa in the step S302 (S302: Yes), the program advances to the step S306, while it advances to the step S303 if the number of printed pages is smaller than the threshold value Pa (S302: No).

In the step S303, the output destination of the print data is determined to be a digital output bin. On the other hand, in the step S306, the output destination of the print data is determined to be the lockable output bin 313.

If it is judged in the step S301 that the judgment criterion for determining the output destination of the print data is the estimated printing time (S301: Yes), the estimated time T required for printing the received print data is calculated (S304).

For example, the estimated printing time T can be calculated from the following equation, where $T_0$ is the estimated printing time per page for a particular printing mode, N is the number of pages to be printed, and K is the confidentiality coefficient:

$$T = T_0 * N * K$$

The estimated printing time per page for a particular printing mode, $T_0$, is preset as shown in FIG. 12 depending on printing modes of color/monochromatic and single/double side, as well as to the size of the paper and the orientation of printing, and saved on the hard disk 303 of the MFP 300.

The confidentiality coefficient K is a coefficient that depends on the importance of confidentiality of the print data. The confidentiality coefficient K is set up relative to the print data on the PC 100 that transmits the print data. For example, if security information such as watermarks of "Important," "Confidential," and "Internal Use Only" is set up on the print data, the document is considered to be of high importance. The higher the importance is, the smaller the confidentiality coefficient K is set in this case. For example, if a watermark such as "Important" is set up, the confidentiality coefficient K is set up as 0.8 while the confidentiality coefficient K is set at 1.0 in other cases. This is due to a security policy that it is preferable for the user to come to the place where the MFP 300 is installed and printing does not start until after user verification is completed if the particular print data has a high degree of importance even if the number of pages to be printed is high. On the other hand, a security policy can be such that print data with a high importance should preferably be printed out to a lockable output bin rather than being held in a digital output bin regardless of the number of pages to be printed. The higher the importance is, the larger the confidentiality coefficient K is set in this case.

As can be seen from the above, the estimated printing time is modified in accordance with the importance of the confidentiality of the print data in this embodiment, but it is not necessarily to be modified. Also, the number of pages to be printed based on the print data which is used as the judgment criterion for determining the output destination of the print data as described before can be modified based on the importance of the confidentiality of the print data.

In the step S305, a judgment is made as to whether the calculated printing time estimate T is larger or not than the predetermined threshold value Ta.

If it is determined that the estimated printing time T is equal to or larger than the threshold value Ta in the step S305 (S305: Yes), the program advances to the step S306, while it advances to the step S303 if it is smaller than the threshold value Ta (S305: No).

In the step S307, the notification process will be done to notify the user about the determined output destination of the print data. Here the user will be notified according to the notification method preset in the confidential printing setup process using the confidential printing setup screen 600 that the digital output bin or the lockable output bin 313 is selected as the output destination in accordance with the decision made in the step S303 or S306. The process in the step S307 is conducted generally similar to the process in the step S207, which will be described below.

Figure 11:
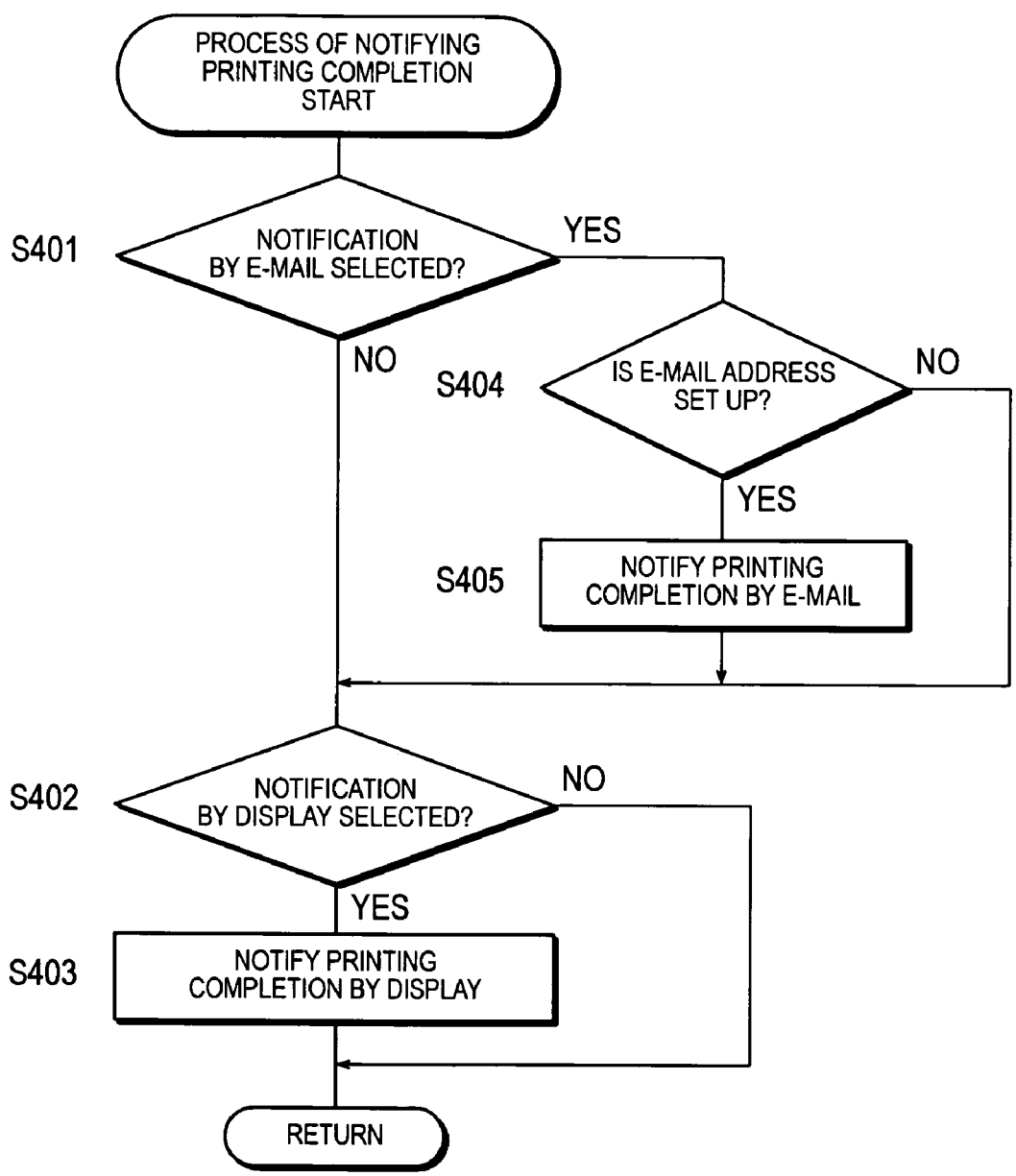
FIG. 11 is a flowchart showing the sequence of the process for notifying printing completion.

Next, the process of notifying the printing completion in the step S208 will be described below with reference to FIG. 11.

First, the MFP 300 makes a judgment whether the e-mail notification method is selected in the confidential printing setup process using the confidential printing setup screen 600 or not (S401). A notification method selected in accordance with the output destination is referenced here (ditto in the following).

If the e-mail notification method is not selected (S401: No), a judgment is made as to whether the method of notifying the user by displaying a notice on the operating panel unit 304 is selected or not (S402). If the method of notifying the user by displaying a notice on the operating panel unit 304 is not selected (S402: No), the program returns to the flowchart of FIG. 8.

If the method of notifying the user by displaying a notice on the operating panel unit 304 is selected (S402: Yes), it is displayed on the operating panel unit 304 that the printed paper is output to the lockable output bin or the normal output bin (S403).

On the other hand, if it is judged that the e-mail notification method is selected in the step S401 (S401: Yes), a judgment is made as to whether the corresponding user's e-mail address is set up or not in the user registration process using the user registration screen 700 (S404).

If the corresponding user's e-mail address is set up (S404: YES), the notification that the printed paper is output to the lockable output bin or the normal output bin is sent to the specified e-mail address (S405), after which the program advances to the step S402. It is preferable here for the notification of the output completion to include information for identifying its own MFP. Having it constituted in such a way, the user can quickly grasp which lockable output bin of the MFP the printed paper is output to, even if the printed data is transferred from the MFP to which it is first transmitted to another MFP.

On the other hand, If no e-mail address is specified for the corresponding user (S404: No), the program advances to the step S402.

As can be seen from the above, the MFP 300 of the present embodiment receives print data for confidential printing, and decides the output destination of the print data received for confidential printing to be either a lockable output bin that can be opened by a key so that the print data can be output in a format of being printed on paper, or a digital output bin that is capable of holding the print data and allowing the print data held there to be taken out for printing based on user verification. In other words, the present embodiment allows the print data to be output in two selectable output formats for the purpose of confidential printing. This makes it possible to select a suitable output format after securing the confidentiality.

Therefore, if the number of pages to be printed is large, i.e., when the printing time is expected to be long, the MFP 300 allows the user to select the print data to be printed and output to a lockable output bin. In such a case, the user can go to the place where the MFP 300 is located in a proper timing for printing completion to obtain the printed matter using a key without having to wait at the MFP 300. On the other hand, if the number of pages to be printed is small, i.e., when the printing time is expected to be short, the MFP 300 can output the print data to a digital output bin, from which the output can be obtained in exchange with the user verification. In such a case, the user can go to the place where the MFP 300 is located and get the printed matter quickly after the user verification is finished.

Thus, the present embodiment enables the user not to wait a long time in front of the MFP 300 contrary to the user's will, while preventing information leakage due to printed matter at the same time.

Moreover, when a lockable output bin is assigned as the output destination and the lockable output bin of the MFP that received the print data is in an unusable state, another MFP having a lockable output bin that can be used is searched and the print data is transferred to said other MFP. This can prevent a situation to occur where the process has to wait until one of the lockable output bins, the number of which is limited, becomes available, thus improving the performance and usage of security printing function.

It is obvious that it is not limited to the particular embodiments shown and described above but may be variously changed and modified without departing from the technical concept.

For example, although an MFP is mentioned as the printing device in the above embodiment, the other printing devices such as a copying machine and a printer can be used.

Although the digital output bin is provided in the hard disk 303 of the MFP 300 in the above embodiment, it is not limited to it. The digital output bin can be provided in the RIP server 200, or can be provided on other equipment on the network 500 that can communicate with the MFP 300.

Although the process shown in FIG. 8 is executed by the MFP 300 in the above embodiment, it is not limited to it. For example, a portion of the process shown in FIG. 8 such as the output destination decision process (S203) can be executed by the RIP server 200.

Although the output destination of the print data is automatically determined by the MFP 300 in correspondence with the information concerning the print data in the above embodiment, the print data output destination can be specified by the user on the PC 100 which is used to transmit the print data.

Moreover, although the RIP server 200 is constituted separately from MFP 300 in the above embodiment, it is not limited to it. A system in which the RIP server 200 is built into each MFP can be applied.

The mechanism and method of conducting various processes in the printing system can be realized by a dedicated hardware circuit, or a programmed computer. Said program can be provided either by a computer readable recording medium such as a flexible disk and a CD-ROM, or by being supplied on-line via a network such as the Internet. In this case, the program recorded on the computer readable recording medium is normally transferred to and stored in a storage unit such as a hard disk. Said program can also be provided as independent application software or can be built into the software of the device as a part of its function.

What is claimed is:

1. A printing device, comprising:
a receiving unit which receives print data for confidential printing;
a lockable output bin in which a printed recording medium based on said print data can be outputted, wherein said lockable output bin is capable of being locked and unlocked by a key;
a holding unit for holding said print data and reading out said print data for printing based on user verification; and
a controller which decides an output destination for said received print data to be either said lockable output bin or said holding unit in accordance with an estimated time required for printing said print data calculated based on a printing condition of said print data, said controller deciding the output destination for said print data to be said lockable output bin if said estimated time is equal to or larger than a predetermined threshold value, and to be said holding unit if said estimated time is smaller than the threshold value, said controller forwarding said print data to another printing device having a lockable output bin that can be used if said controller decides that said output destination for said print data is said lockable output bin and said lockable output bin is unavailable.

2. A printing device, comprising:
a receiving unit which receives print data for confidential printing;
a lockable output bin in which a printed recording medium based on said print data can be outputted, wherein said lockable output bin is capable of being locked and unlocked by a key;
a holding unit for holding said print data and reading out said print data for printing based on user verification; and
a controller which decides an output destination for said received print data to be either said lockable output bin or said holding unit in accordance with a total of pages to be printed based on the print data, said controller deciding the output destination for said print data to be said lockable output bin if the total of pages to be printed is equal to or larger than a predetermined threshold value, and to be said holding unit if the total of pages to be printed is smaller than the threshold value, said controller forwarding said print data to another printing device having a lockable output bin that can be used if said controller decides that said output destination for said print data is said lockable output bin and said lockable output bin is unavailable.

3. A printing device, comprising:
a receiving unit which receives print data for confidential printing;
a lockable output bin in which a printed recording medium based on said print data can be outputted, wherein said lockable output bin is capable of being locked and unlocked by a key;
a holding unit for holding said print data and reading out said print data for printing based on user verification; and
a controller which decides an output destination for said received print data to be either said lockable output bin or said holding unit in accordance with information concerning the print data modified based on degree of importance of confidentiality of the print data, said controller forwarding said print data to another printing device having a lockable output bin that can be used if said controller decides that said output destination for said print data is said lockable output bin and said lockable output bin is unavailable.

4. The printing device as claimed in claim 1, wherein said controller further forwards unlocking information as the key to open the other lockable output bin to said other printing device.

5. The printing device as claimed in claim 1, wherein said holding unit is provided in the printing device.

6. The printing device as claimed in claim 1, wherein said holding unit is provided in a printing device that converts the print data into bitmap format data and forwards the data to said receiving unit.

7. The printing device as claimed in claim 1, wherein said holding unit is provided in equipment located on a network through which it can communicate with the printing device.

8. The printing device as claimed in claim 1, further comprising: a notifying unit for notifying the decided output destination of the print data.

9. The printing device as claimed in claim 8, wherein said notifying unit further notifying completion of printing the print data.

10. A printing device, comprising:
a receiving unit which receives print data for confidential printing;
a lockable output bin in which one printed recording medium based on said print data can be outputted, wherein said lockable output bin is capable of being locked and unlocked by a key;
a holding unit for holding said print data and reading out said print data for printing based on user verification; and
a controller which decides an output destination for said received print data to be either said lockable output bin or said holding unit in accordance with an estimated time required for printing said print data calculated based on a printing condition of said print data if said print data is not forwarded from another printing device, said controller deciding the output destination for said print data to be said lockable output bin if said estimated time is equal to or larger than a predetermined threshold value, and to be said holding unit if said estimated time is smaller than the threshold value, said controller assigning said lockable output bin as the output destination for said print data if said print data is forwarded from said another printing device.

11. A printing device, comprising:
a receiving unit which receives print data for confidential printing;
a lockable output bin in which one printed recording medium based on said print data can be outputted wherein said lockable output bin is capable of being locked and unlocked by a key;
a holding unit for holding said print data and reading out said print data for printing based on user verification; and
a controller which decides an output destination for said received print data to be either said lockable output bin or said holding unit in accordance with a total of pages to be printed based on the print data if said print data is not forwarded from another printing device, said controller deciding the output destination for said print data to be said lockable output bin if the total of pages to be printed is equal to or larger than a predetermined threshold value, and to be said holding unit if the total of pages to be printed is smaller than the threshold value, said controller assigning said lockable output bin as the output destination for said print data if said print data is forwarded from said another printing device.

12. A printing device, comprising:
a receiving unit which receives print data for confidential printing;
a lockable output bin in which one printed recording medium based on said print data can be outputted, wherein said lockable output bin is capable of being locked and unlocked by a key;
a holding unit for holding said print data and reading out said print data for printing based on user verification; and
a controller which decides an output destination for said received print data to be either said lockable output bin or said holding unit in accordance with information concerning the print data modified based on degree of importance of confidentiality of the print data, if said print data is not forwarded from another printing device, said controller assigning said lockable output bin as the output destination for said print data if said print data is forwarded from said another printing device.

13. A printing method comprising:
1) receiving print data for confidential printing;
2) deciding an output destination on a printing device having a lockable output bin and a holding unit for said received print data to be either the lockable output bin or the holding unit in accordance with an estimated time required for printing said print data calculated based on a printing condition of said print data, and the output destination for said print data to be said lockable output bin if said estimated time is equal to or larger than a predetermined threshold value, and to be said holding unit if said estimated time is smaller than the threshold value, the lockable output bin in which a printed recording medium based on said print data can be outputted, wherein the lockable output bin is capable of being locked and unlocked by a key, the holding unit for holding said print data and reading out said print data for printing based on user verification;
3) searching, if said lockable output bin is decided as the output destination for said print data and said lockable output bin is unavailable, another printing device having a lockable output bin that can be used; and
4) forwarding said print data to said another printing device if said another printing device is found by said step of searching.

14. A printing method comprising:
1) receiving print data for confidential printing;
2) making a judgment as to whether the received print data is forwarded from another printing device or not;
3) deciding an output destination on a printing device having a lockable output bin and a holding unit for said received print data to be either the lockable output bin or the holding unit in accordance with an estimated time required for printing said print data calculated based on a printing condition of said print data, and the output destination for said print data to be said lockable output bin if said estimated time is equal to or larger than a predetermined threshold value, and to be said holding unit if said estimated time is smaller than the threshold value, the lockable output bin in which a printed recording medium based on said print data can be outputted, wherein the lockable output bin is capable of being locked and unlocked by a key, the holding unit for holding said print data and reading out said print data for printing based on user verification;
4) conducting, if it is judged that said print data is not forwarded from said another printing device, said step 3; and
5) assigning, if it is judged that said print data is forwarded from said another printing device, said lockable output bin as the output destination for said print data without conducting said step 3.

15. A non-transitory computer readable storage medium stored with computer program for controlling a printing device, wherein said computer program causing said printing device to execute a process comprising:
1) receiving print data for confidential printing;
2) making a judgment as to whether the received print data is forwarded from another printing device or not;
3) deciding an output destination on a printing device having a lockable output bin and a holding unit for said received print data to be either the lockable output bin or the holding unit in accordance with an estimated time required for printing said print data calculated based on a printing condition of said print data, and the output destination for said print data to be said lockable output bin if said estimated time is equal to or larger than a predetermined threshold value, and to be said holding unit if said estimated time is smaller than the threshold value, the lockable output bin, to which said print data can be output in a form of being printed on at least one recording medium, being capable of being locked and unlocked by a key, the holding unit being capable of holding said print data and allowing said print data held therein to be read out for printing based on user verification;
4) conducting, if it is judged that said print data is not forwarded from said another printing device, said step 3; and
5) assigning, if it is judged that said print data is forwarded from said another printing device, said lockable output bin as the output destination for said print data without conducting said step 3.

16. The printing device according to claim 1, further comprising:
a searching unit which searches, if said lockable output bin is decided as the output destination for said print data by said controller and said lockable output bin is in an unusable state, another printing device having another lockable output bin that can be used.

17. The printing device as claimed in claim 1, wherein said controller decides the output destination for said print data in accordance with information concerning the print data, which is modified based on degree of importance of confidentiality of the print data.

18. A printing method comprising:
1) receiving print data for confidential printing;
2) deciding an output destination on a printing device having a lockable output bin and a holding unit for said received print data to be either the lockable output bin or the holding unit in accordance with a total of pages to be printed based on the print data, and the output destination for said print data to be said lockable output bin if the total of pages to be printed is equal to or larger than a predetermined threshold value, and to be said holding unit if the total of pages to be printed is smaller than the threshold value, the lockable output bin in which a printed recording medium based on said print data can be outputted, wherein the lockable output bin is capable of being locked and unlocked by a key, the holding unit for holding said print data and reading out said print data for printing based on user verification;
3) searching, if said lockable output bin is decided as the output destination for said print data and said lockable output bin is unavailable, another printing device having a lockable output bin that can be used; and
4) forwarding said print data to said another printing device if said another printing device is found by said step of searching.

19. A printing method comprising:
1) receiving print data for confidential printing;
2) deciding an output destination on a printing device having a lockable output bin and a holding unit for said received print data to be either the lockable output bin or the holding unit in accordance with information concerning the print data, modified based on the degree of importance of confidentiality of the print data, the lockable output bin in which a printed recording medium based on said print data can be outputted, wherein the lockable output bin is capable of being locked and unlocked by a key, the holding unit for holding said print data and reading out said print data for printing based on user verification;
3) searching, if said lockable output bin is decided as the output destination for said print data and said lockable output bin is unavailable, another printing device having a lockable output bin that can be used; and
4) forwarding said print data to said another printing device if said another printing device is found by said step of searching.

20. A printing method comprising:
1) receiving print data for confidential printing;
2) making a judgment as to whether the received print data is forwarded from another printing device or not;
3) deciding an output destination on a printing device having a lockable output bin and a holding unit for said received print data to be either the lockable output bin or the holding unit in accordance with a total of pages to be printed based on the print data if said print data is not forwarded from another printing device, and the output destination for said print data to be said lockable output bin if said total of pages is equal to or larger than a predetermined threshold value, and to be said holding unit if said total of pages is smaller than the threshold value, the lockable output bin in which a printed recording medium based on said print data can be outputted, wherein the lockable output bin is capable of being locked and unlocked by a key, the holding unit for holding said print data and reading out said print data for printing based on user verification;
4) conducting, if it is judged that said print data is not forwarded from said another printing device, said step 3; and
5) assigning, if it is judged that said print data is forwarded from said another printing device, said lockable output bin as the output destination for said print data without conducting said step 3.

21. A printing method comprising:
1) receiving print data for confidential printing;
2) making a judgment as to whether the received print data is forwarded from another printing device or not; and
3) deciding an output destination on a printing device having a lockable output bin and a holding unit for said received print data to be either the lockable output bin or the holding unit in accordance with information concerning the print data, modified based on degree of confidentiality of the print data, the lockable output bin in which a printed recording medium based on said print data can be outputted, wherein the lockable output bin is capable of being locked and unlocked by a key, the holding unit for holding said print data and reading out said print data for printing based on user verification;

4) conducting, if it is judged that said print data is not forwarded from said another printing device, said step 3; and 5) assigning, if it is judged that said print data is forwarded from said another printing device, said lockable output bin as the output destination for said print data without conducting said step 3.

22. A non-transitory computer readable storage medium stored with computer program for controlling a printing device, wherein said computer program causing said printing device to execute a process comprising:

1) receiving print data for confidential printing;
2) making a judgment as to whether the received print data is forwarded from another printing device or not;
3) deciding an output destination on a printing device having a lockable output bin and a holding unit for said received print data to be either the lockable output bin or the holding unit in accordance with a total of pages to be printed based on the print data if said print data is not forwarded from another printing device, and the output destination for said print data to be said lockable output bin if said total of pages is equal to or larger than a predetermined threshold value, and to be said holding unit if said total of pages is smaller than the threshold value, the lockable output bin, to which said print data can be output in a form of being printed on at least one recording medium, being capable of being locked and unlocked by a key, the holding unit being capable of holding said print data and allowing said print data held therein to be read out for printing based on user verification;
4) conducting, if it is judged that said print data is not forwarded from said another printing device, said step 3; and
5) assigning, if it is judged that said print data is forwarded from said another printing device, said lockable output bin as the output destination for said print data without conducting said step 3.

23. A non-transitory computer readable storage medium stored with computer program for controlling a printing device, wherein said computer program causing said printing device to execute a process comprising:

1) receiving print data for confidential printing;
2) making a judgment as to whether the received print data is forwarded from another printing device or not; and
3) deciding an output destination on a printing device having a lockable output bin and a holding unit for said received print data to be either the lockable output bin or the holding unit in accordance with information concerning the print data, modified based on degree of confidentially of the print data, the lockable output bin, to which said print data can be output in a form of being printed on at least one recording medium, being capable of being locked and unlocked by a key, the holding unit being capable of holding said print data and allowing said print data held therein to be read out for printing based on user verification;
4) conducting, if it is judged that said print data is not forwarded from said another printing device, said step 3; and 5) assigning, if it is judged that said print data is forwarded from said another printing device, said lockable output bin as the output destination for said print data without conducting said step 3.

24. The printing device as claimed in claim 2, wherein said controller further forwards unlocking information as the key to open the other lockable output bin to said other printing device.

25. The printing device as claimed in claim 2, wherein said controller decides the output destination for said print data in accordance with information concerning the print data, which is modified based on degree of importance of confidentiality of the print data.

26. The printing device as claimed in claim 2, wherein said holding unit is provided in the printing device.

27. The printing device as claimed in claim 2, wherein said holding unit is provided in a printing device that converts the print data into bitmap format data and forwards the data to said receiving unit.

28. The printing device as claimed in claim 2, wherein said holding unit is provided in equipment located on a network through which it can communicate with the printing device.

29. The printing device as claimed in claim 2, further comprising:
a notifying unit for notifying the decided output destination of the print data.

30. The printing device as claimed in claim 29, wherein said notifying unit further notifying completion of printing the print data.

31. The printing device according to claim 2, further comprising:
a searching unit which searches, if said lockable output bin is decided as the output destination for said print data by said controller and said lockable output bin is in an unusable state, another printing device having another lockable output bin that can be used.

32. The printing device as claimed in claim 3, wherein said controller further forwards unlocking information as the key to open the other lockable output bin to said other printing device.

33. The printing device as claimed in claim 3, wherein said holding unit is provided in the printing device.

34. The printing device as claimed in claim 3, wherein said holding unit is provided in a printing device that converts the print data into bitmap format data and forwards the data to said receiving unit.

35. The printing device as claimed in claim 3, wherein said holding unit is provided in equipment located on a network through which it can communicate with the printing device.

36. The printing device as claimed in claim 3, further comprising:
a notifying unit for notifying the decided output destination of the print data.

37. The printing device as claimed in claim 36, wherein said notifying unit further notifying completion of printing the print data.

38. The printing device according to claim 3, further comprising:
a searching unit which searches, if said lockable output bin is decided as the output destination for said print data by said controller and said lockable output bin is in an unusable state, another printing device having another lockable output bin that can be used.

39. The printing device as claimed in claim 10, wherein said controller further forwards unlocking information as the key to open the other lockable output bin to said other printing device.

40. The printing device as claimed in claim 10, wherein said controller decides the output destination for said print data in accordance with information concerning the print data, which is modified based on degree of importance of confidentiality of the print data.

41. The printing device as claimed in claim 10, wherein said holding unit is provided in the printing device.

42. The printing device as claimed in claim 10, wherein said holding unit is provided in a printing device that converts the print data into bitmap format data and forwards the data to said receiving unit.

43. The printing device as claimed in claim 10, wherein said holding unit is provided in equipment located on a network through which it can communicate with the printing device.

44. The printing device as claimed in claim 10, further comprising:
a notifying unit for notifying the decided output destination of the print data.

45. The printing device as claimed in claim 44, wherein said notifying unit further notifying completion of printing the print data.

46. The printing device according to claim 10, further comprising:
a searching unit which searches, if said lockable output bin is decided as the output destination for said print data by said controller and said lockable output bin is in an unusable state, another printing device having another lockable output bin that can be used.

47. The printing device as claimed in claim 11, wherein said controller further forwards unlocking information as the key to open the other lockable output bin to said other printing device.

48. The printing device as claimed in claim 11, wherein said controller decides the output destination for said print data in accordance with information concerning the print data, which is modified based on degree of importance of confidentiality of the print data.

49. The printing device as claimed in claim 11, wherein said holding unit is provided in the printing device.

50. The printing device as claimed in claim 11, wherein said holding unit is provided in a printing device that converts the print data into bitmap format data and forwards the data to said receiving unit.

51. The printing device as claimed in claim 11, wherein said holding unit is provided in equipment located on a network through which it can communicate with the printing device.

52. The printing device as claimed in claim 11, further comprising:
a notifying unit for notifying the decided output destination of the print data.

53. The printing device as claimed in claim 52, wherein said notifying unit further notifying completion of printing the print data.

54. The printing device according to claim 11, further comprising:
a searching unit which searches, if said lockable output bin is decided as the output destination for said print data by said controller and said lockable output bin is in an unusable state, another printing device having another lockable output bin that can be used.

55. The printing device as claimed in claim 12, wherein said controller further forwards unlocking information as the key to open the other lockable output bin to said other printing device.

56. The printing device as claimed in claim 12, wherein said holding unit is provided in the printing device.

57. The printing device as claimed in claim 12, wherein said holding unit is provided in a printing device that converts the print data into bitmap format data and forwards the data to said receiving unit.

58. The printing device as claimed in claim 12, wherein said holding unit is provided in equipment located on a network through which it can communicate with the printing device.

59. The printing device as claimed in claim 12, further comprising:
a notifying unit for notifying the decided output destination of the print data.

60. The printing device as claimed in claim 59, wherein said notifying unit further notifying completion of printing the print data.

61. The printing device according to claim 12, further comprising:
a searching unit which searches, if said lockable output bin is decided as the output destination for said print data by said controller and said lockable output bin is in an unusable state, another printing device having another lockable output bin that can be used.

* * * * *